United States Patent
Larson (10) Patent No.: US 9,703,312 B2
(45) Date of Patent: Jul. 11, 2017

(54) NON-JAMMING STOP MODULE FOR HIGH REVOLUTION APPLICATIONS

(71) Applicant: Moog Inc., East Aurora, NY (US)

(72) Inventor: Lowell Van Lund Larson, Huntington Beach, CA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 14/868,441

(22) Filed: Sep. 29, 2015

(65) Prior Publication Data

US 2017/0090505 A1    Mar. 30, 2017

(51) Int. Cl.
| | |
|---|---|
| *G05G 5/04* | (2006.01) |
| *F16H 35/00* | (2006.01) |
| *F16D 41/06* | (2006.01) |
| *B64C 13/28* | (2006.01) |
| *F16D 67/02* | (2006.01) |

(52) U.S. Cl.
CPC ............. *G05G 5/04* (2013.01); *F16H 35/00* (2013.01); *B64C 13/28* (2013.01); *F16D 41/06* (2013.01); *F16D 67/02* (2013.01); *F16H 2035/006* (2013.01)

(58) Field of Classification Search
None
See application file for complete search history.

(56) References Cited

U.S. PATENT DOCUMENTS

| | | | |
|---|---|---|---|
| 2,855,888 A * | 10/1958 | Hazen | B64C 13/24 |
| | | | 116/294 |
| 3,084,777 A | 4/1963 | McCallum | |
| 4,064,981 A | 12/1977 | House et al. | |
| 4,633,984 A | 1/1987 | Hudson | |
| 4,641,737 A | 2/1987 | Gillingham et al. | |
| 4,643,290 A | 2/1987 | Metcalf | |
| 4,721,196 A | 1/1988 | Layer et al. | |
| 4,834,225 A * | 5/1989 | Klopfenstein | B64C 13/28 |
| | | | 188/134 |
| 4,867,295 A | 9/1989 | Metcalf et al. | |
| 5,370,011 A | 12/1994 | Gilges | |
| 5,769,362 A * | 6/1998 | Greene | F16F 15/12 |
| | | | 244/110 D |
| 8,393,568 B2 * | 3/2013 | Maresko | B64C 13/28 |
| | | | 244/215 |

FOREIGN PATENT DOCUMENTS

EP    0153079 A1    8/1998

* cited by examiner

*Primary Examiner* — Mark Manley
(74) *Attorney, Agent, or Firm* — Hodgson Russ LLP (57) ABSTRACT

A stop mechanism for a drive system includes a one-way clutch, a brake, a stop feature, and a linkage. The one-way clutch couples with a drive shaft of the system when the drive shaft is rotating in a first direction but not in an opposite direction. The brake is connected to the drive shaft through the first one-way clutch and is operable to stop drive shaft rotation in the first direction. The stop feature is carried by an output element driven by the drive shaft and actuates the linkage to operate the first brake when the output element reaches a predetermined limit position when moving in a direction corresponding to the first drive direction of the drive shaft. A bidirectional stop mechanism is provided by adding a second one-way clutch, a second brake, and a second stop feature arranged to act in the opposite rotational direction of the drive shaft.

18 Claims, 4 Drawing Sheets

NON-JAMMING STOP MODULE FOR HIGH REVOLUTION APPLICATIONS

FIELD OF THE INVENTION

The present invention relates generally to mechanisms for stopping a rotary or linear drive system when an end-of-stroke position is reached by the drive system. More particularly, the present invention relates to an internal mechanical stop module configured to stop high-RPM rotation of a drive motor of the drive system in a manner that avoids jamming the drive system.

BACKGROUND OF THE INVENTION

A motorized drive system may drive motion of an output element over a defined path range (stroke). For example, a motor-driven actuator is commonly used to move an aircraft flight control surface (e.g. a flap or a slat) or an aircraft door in a bidirectional manner between an extended position and a retracted position. The control system commanding the drive motor imposes travel limits on the rotary drive system. In addition, a mechanical stop module is commonly provided as a safeguard to prevent overtravel in the event the motor control system experiences a failure. The stop module functions to stop rotation of the rotary drive system when the rotary drive system reaches an end-of-stroke position in one travel direction, and allows counter-rotation of the drive system motor for travel in the opposite direction.

One known stop mechanism includes an end stop provided on an arm of an output bell crank actuated by a rotary drive system, and a detent surface arranged to engage the end stop to limit the angular stroke of the bell crank. Because the stopping torque is applied to the bell crank arm, a torque limiter is needed to protect the system from very high torque levels. Consequently, this type of mechanism adds weight and complexity to the rotary drive system.

Other known mechanisms for preventing overtravel use a travelling nut assembly limited by end stops. For example, U.S. Pat. No. 4,064,981 discloses a stop mechanism having a travelling nut assembly that contacts a shock absorbing stop to terminate shaft rotation by frictionally jamming screw threads between the nut assembly and the driven shaft. Another known stop mechanism includes a moving nut having "dog stops" on an end face of the nut that are engaged by mating dog stops on an end stop to prevent further rotation when the nut reaches an end-of-stroke position. Mechanisms that rely on a travelling nut are generally proportional in size and weight to the number of motor rotations per stroke. Consequently, travelling nut systems may be too large and/or heavy in some applications, particularly aircraft applications. A differential drive may be arranged to help reduce screw thread length in a travelling nut system, however this increases the complexity of the system, making it more expensive to design, make, and assemble.

U.S. Pat. No. 4,867,295 discloses a travelling nut stop mechanism that includes a separate screw shaft along which the nut travels, wherein the screw shaft is driven by the rotatable drive shaft. A rotating stop and a stationery stop are provided at one end of the screw shaft, and a bearing housing is provided at the other end of the screw shaft to support the screw shaft for rotation and axial movement. The travelling nut is moveable in one direction to engage the rotating stop and stationery stop, thereby stopping rotary motion of the screw shaft. The travelling nut is moveable in the other direction into contact with the bearing housing to exert an axial force upon the screw shaft such that the screw shaft moves axially to engage the rotating and stationery stops, whereupon rotary motion of the screw shaft is terminated. The screw shaft acts as a torsion shock absorber upon the termination of the rotary motion of the screw shaft by the rotating and stationery stops. Much like the mechanisms mentioned above, the weight, size, and complexity of the system are limiting factors.

Other known of stop mechanisms use a Geneva drive to count motor rotations and activate a pawl to pop into engagement or apply dog stops at the end-of-stroke. Examples of this type of stop mechanism are found in U.S. Pat. Nos. 4,641,737 and 4,721,196. Such systems are mechanically complex, and torsional shock absorbing means may be needed. If this type of stop mechanism is used at or near the motor in a system where there are many motor rotations between end-of-stroke limits, the counting mechanism becomes large, heavy, and/or complicated.

Another known approach for preventing overtravel relies on valving or switches to halt power to the drive motor to prevent motion beyond an end-of-stroke limit. However, this approach does not prevent manual driving from over running normal end-of-stroke limits.

SUMMARY OF THE INVENTION

The invention provides a stop mechanism for preventing overtravel in a drive system having a motor, a drive shaft rotated by the motor, and an output element rotatably or linearly driven by rotation of the drive shaft. The stop mechanism stops drive shaft rotation without jamming, and does not require additional torque or shock absorbing components. The stop mechanism is lightweight and has a compact size envelope that is not proportional to the number of motor revolutions in a drive stroke of the system. End-of-stroke limit positions are easily defined.

The stop mechanism generally comprises a first one-way clutch, a first brake, a first stop feature, and a linkage. The first one-way clutch couples with the drive shaft when the drive shaft is rotating in a first drive direction but not when the drive shaft is rotating in a second drive direction opposite the first drive direction. The first brake is connected to the drive shaft by way of the first one-way clutch and is operable to stop rotation of the drive shaft in the first drive direction. The first stop feature is carried by the output element, and the linkage connects the first stop feature to the first brake. The first stop feature actuates the linkage to operate the first brake to stop rotation of the drive shaft in the first drive direction when the output element reaches a predetermined first limit position when moving in a first driven direction corresponding to the first drive direction of the drive shaft. A bidirectional stop mechanism may be provided by adding a second one-way clutch, a second brake, and a second stop feature arranged to act in the opposite rotational direction of the drive shaft using the same linkage.

In a first embodiment, the first and second one-way clutches may be sprag clutches and the first and second brakes may be disc brakes having one or more frictional plates. The linkage of the first embodiment may be configured as a pivotally mounted bell-crank link having a first leg arranged to be engaged by either the first or second stop feature, and a second leg for operating either the first or second brake. The stop features may be arranged at predetermined angular positions on a rotationally driven output element to define respective angular limit positions.

In a second embodiment, the first and second one-way clutches may be first and second capstan springs helically wound about the drive shaft itself or a part that is rotationally coupled to the drive shaft, wherein the first and second capstan springs also act as the first and second brakes. In the second embodiment, the linkage may include a pivotally mounted bell crank link cooperating with a secondary link for tightening one of the capstan springs depending upon the rotational direction of the drive shaft.

A third embodiment is generally similar to the first embodiment, except that the output element is linearly driven to travel in first and second linear travel directions respectively corresponding to the first and second rotational drive directions of the drive shaft. The stop features may be arranged at predetermined linear positions on the linearly driven output element to define respective limit positions. The third embodiment may be adapted to use capstan springs as taught by the second embodiment.

BRIEF DESCRIPTION OF THE DRAWING VIEWS

The nature and mode of operation of the present invention will now be more fully described in the following detailed description of the invention taken with the accompanying drawing figures, in which.

DETAILED DESCRIPTION OF THE INVENTION

Figure 1:
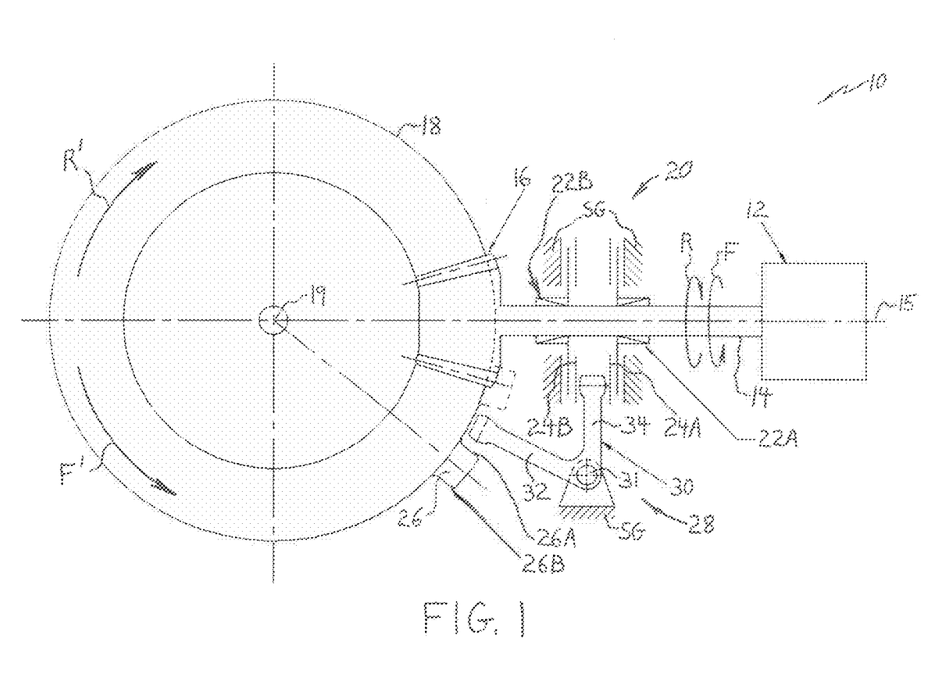
FIG. 1 is a schematic view of a stop mechanism formed in accordance with a first embodiment of the present invention.

FIG. 1 schematically illustrates a rotary drive system 10 incorporating a stop mechanism 20 formed in accordance with a first embodiment of the present invention. Rotary system 10 has a motor 12 operable to rotate a drive shaft 14 about axis 15 in a first drive direction F and in a second drive direction R opposite first drive direction F. Rotary system 10 may also have one or more transmission elements, represented schematically in FIG. 1 as a bevel gear 16, configured to transmit rotational motion of drive shaft 14 to an output element 18 rotatable about axis 19. As may be understood, when drive shaft 14 rotates in the first drive direction F, output element 18 is caused to rotate in a first driven direction F', and when drive shaft 14 rotates in the second drive direction R, output element 18 is caused to rotate in a second driven direction R'. Output element 18 of rotary system 10 may be part of a rotary drive system providing reciprocal motion through an intended finite range, also referred to as the stroke. For example, output element 18 may be part of a drive system for moving a flight control surface or a door on an aircraft. Motor 12 may be any type of motor, such as a hydraulic motor or an electric motor.

In accordance with the present invention, stop mechanism 20 automatically brakes rotation of drive shaft 14 when output element 18 reaches a predetermined angular position corresponding to an end-of-stroke position of rotary system 10. Stop mechanism 20 comprises a first one-way clutch 22A for coupling with drive shaft 14 when the drive shaft is rotating in first drive direction F but not when the drive shaft is rotating in second drive direction R. Stop mechanism 20 also comprises a first brake 24A connected to drive shaft 14 by way of first one-way clutch 22A, wherein first brake 24A is operable to stop rotation of drive shaft 14 in first drive direction F. Stop mechanism 20 further comprises a first stop feature 26A carried by output element 18, and a linkage 28 for connecting first stop feature 26A to first brake 24A. First stop feature 26A actuates linkage 28 to operate first brake 24A to stop rotation of drive shaft 14 in first drive direction F when output element 18 reaches a predetermined first angular position when rotating in first driven direction F'. Thus, stop mechanism 20 provides a limit stop when rotary system 10 reaches its end-of-stroke as drive shaft 14 rotates in first drive direction F.

Stop mechanism 20 may be bidirectional such that it also provides a limit stop when rotary system 10 reaches its end-of-stroke when drive shaft 14 is rotating in second drive direction R. As shown in FIG. 1, stop mechanism 20 may further comprise a second one-way clutch 22B for coupling with drive shaft 14 when the drive shaft is rotating in second drive direction R but not when the drive shaft is rotating in first drive direction F, a second brake 24B connected to drive shaft 14 by way of second one-way clutch 22B and operable to stop rotation of drive shaft 14 in second drive direction R, and a second stop feature 26B carried by output element 18. Linkage 28 connects second stop feature 26B to second brake 24B. Second stop feature 26B actuates linkage 28 to operate second brake 24B to stop rotation of drive shaft 14 in second drive direction R when output element 18 reaches a predetermined second angular position when rotating in second driven direction R'. Thus, stop mechanism 20 may provide a limit stop when rotary system 10 reaches its end-of-stroke as drive shaft 14 rotates in second drive direction R.

Figure 2:
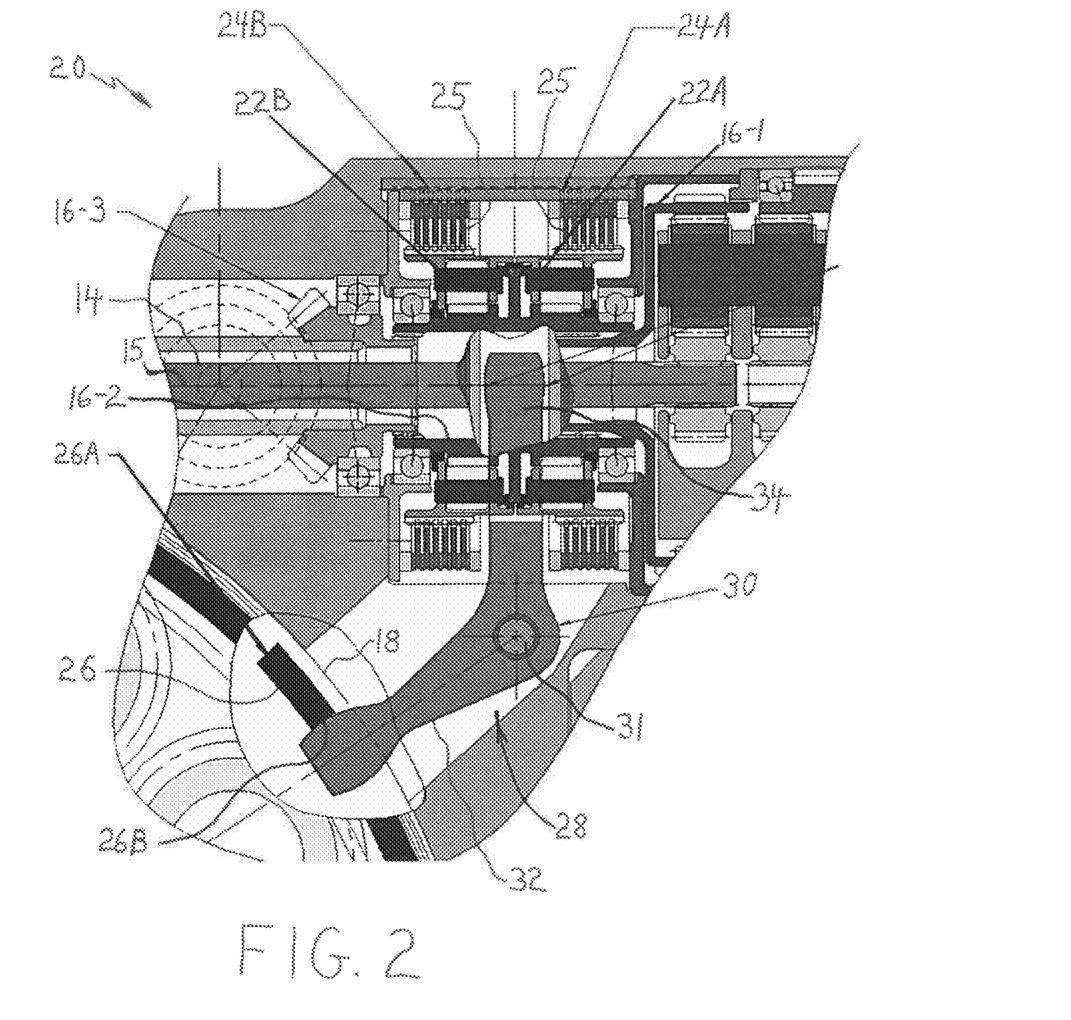
FIG. 2 is a sectional view of a stop mechanism formed in accordance with the first embodiment, wherein the view has cutaway regions for sake of illustration.

FIG. 2 shows an actual implementation of stop mechanism 20. As may be seen, drive shaft 14 may be connected to output element 18 through various transmission elements including a speed-summing differential gear assembly 16-1, a splined coupler 16-2 coaxial with drive shaft 14, and output gears 16-3. In FIG. 2, first and second one-way clutches 22A, 22B are embodied as sprag clutches, and first and second brakes 24A, 24B are frictional disc brakes each having one or more brake plates 25. First stop feature 26A and second stop feature 26B may be respective surfaces of a tang 26 fixedly attached to output element 18. Linkage 28 may include a bell-crank link 30 mounted to pivot about a pivot axis defined by a pivot pin 31 secured to a structural ground SG (see FIG. 1).

As shown in FIG. 2, one-way clutches 22A, 22B may be mounted on splined coupler 16-2 for coupling with drive shaft 14. When drive shaft 14 is rotating in first drive direction F, first one-way clutch 22A is coupled to drive shaft 14 by way of splined coupler 16-2 and differential gear assembly 16-1 such that first one-way clutch 22A rotates together with the drive shaft about axis 15 in first drive direction F, whereas second one-way clutch 22B is not coupled to drive shaft 14 and does not rotate with the drive shaft in first drive direction F. Conversely, when drive shaft 14 is rotating in second drive direction R, second one-way clutch 22B is coupled to drive shaft 14 by way of splined coupler 16-2 and differential gear assembly 16-1 such that second one-way clutch 22B rotates together with drive shaft 14 about axis 15 in second drive direction R, whereas first one-way clutch 22A is not coupled to drive shaft 14 and does not rotate with the drive shaft in second drive direction R. Brake plates 25 of first and second brakes 24A, 24B are respectively mounted on first and second one-way clutched 22A, 22B in splined fashion such that the brake plates 25 rotate with the associated one way-clutch and are axially displaceable relative to the associated one-way clutch to enable the brake plates 25 to be compressed against structural ground SG.

Bell-crank link 30 has a first leg 32 and a second leg 34 angularly offset from first leg 32. First leg 32 is arranged to be engaged by first stop feature 26A as output element 18 reaches a predetermined angular position about axis 19 when rotating in first driven direction F'. The angular position is chosen to correspond with an end-of-stroke position in first drive direction F. This engagement of first leg 32 causes pivotal motion of bell-crank link 30 in a first pivot direction (clockwise in FIGS. 1 and 2). As may be understood, when bell-crank link 30 is caused to pivot in the first pivot direction, second leg 34 engages an adjacent frictional brake plate 25 of first brake 24A and compresses the stack of brake plates 25 to frictionally brake the plates against structural ground SG. Consequently, first one-way clutch 22A is braked along with splined coupler 16-2, differential 16-1, such that drive shaft 14 is ultimately braked against further rotation in first drive direction F. However, drive shaft 14 remains free to rotate in second drive direction R because of the one-way nature of first one-way clutch 22A.

In a bidirectional stop mechanism 20 as shown in FIGS. 1 and 2, first leg 32 is also arranged to be engaged by second stop feature 26B as output element 18 reaches a predetermined angular position about axis 19 when rotating in second driven direction R', wherein the angular position is chosen to correspond with an end-of-stroke position in second drive direction R. This engagement causes pivotal motion of bell-crank link 30 in a second pivot direction (counter-clockwise in FIGS. 1 and 2). As will be understood, the braking operation described above with respect to first one-way-clutch 22A and first brake 24A occurs in mirror image fashion with respect to second one-way-clutch 22B and second brake 24B, thereby braking rotation of drive shaft 14 in second drive direction R. At this point, drive shaft 14 is free to rotate again in first drive direction F to begin another stroke.

In an optional enhancement of stop mechanism 20, torque modulation of the disc brakes using "bungee" loaded springs may be implemented to attenuate the normal increasing torque experienced during application of the disc brakes. For example, the torque may be limited to a preset level, or the torque may increase at a different rate after a certain predetermined torque has been attained.

Figure 3:
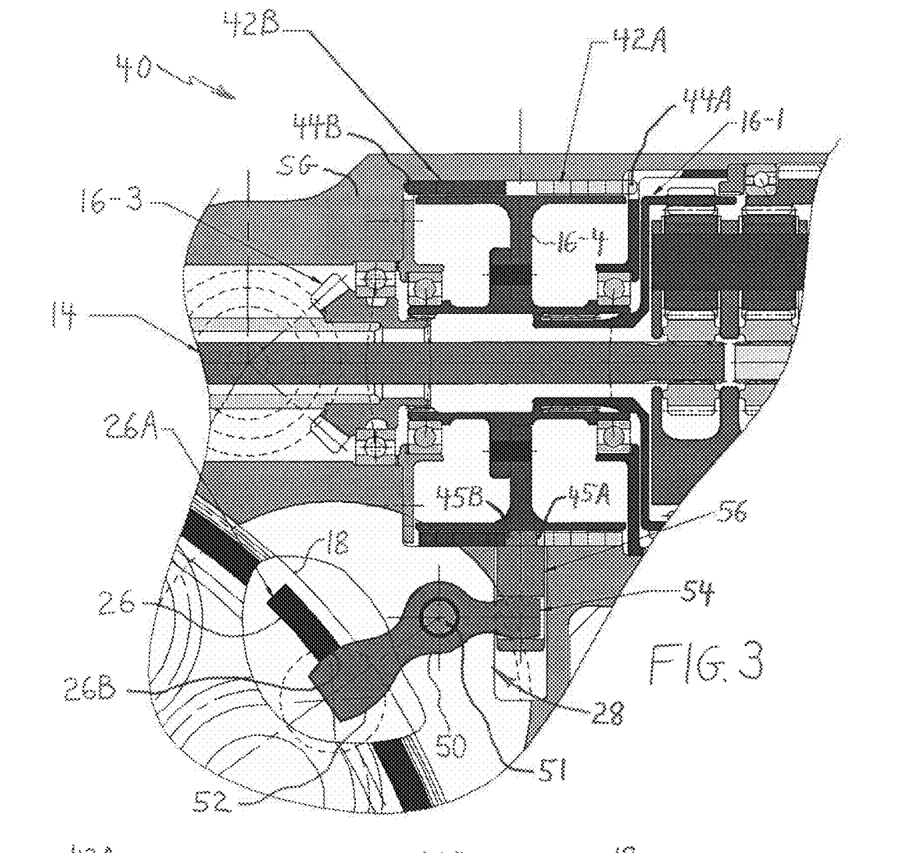
FIG. 3 is a sectional view of a stop mechanism formed in accordance with a second embodiment of the present invention, wherein the view has a cutaway region for sake of illustration.
Figure 4:
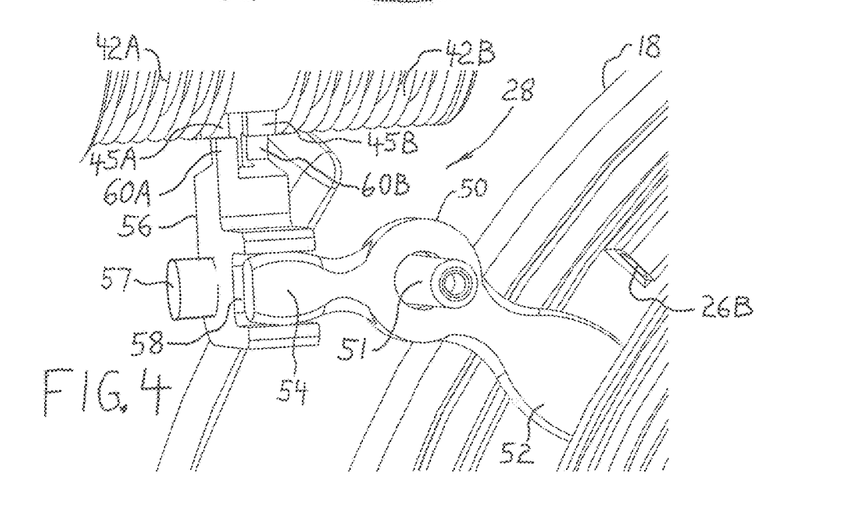
FIG. 4 is an enlarged perspective view showing a linkage of the stop mechanism shown in FIG. 3.

Attention is now directed to FIGS. 3 and 4 illustrating a stop mechanism 40 formed in accordance with a second embodiment of the present invention. Stop mechanism 40 is generally similar to stop mechanism 20 of the first embodiment, except that stop mechanism 40 uses a first capstan spring 42A as a combined first one-way clutch and first brake, and uses a second capstan spring 42B as a combined second one-way clutch and second brake. Also, linkage 28 has a different configuration than that of the first embodiment.

As may be seen in FIG. 3, first and second capstan springs 42A, 42B are helically wound in opposite directions about a splined coupler 16-4 rotationally coupled to drive shaft 14 by way of differential gear assembly 16-1. Splined coupler 16-4 is similar to splined coupler 16-2 of the first embodiment in that it couples the drive shaft 14 and differential 16-1 to output gears 16-3. In normal drive operation between end-of-stroke limits, the helical windings of first and second capstan springs 42A, 42B are such that a slight radial clearance is provided between the capstan springs and splined coupler 16-4. First capstan spring 42A has a fixed end 44A attached to a structural ground SG and an adjustment end 45A connected to linkage 28. Likewise, second capstan spring 42B has a fixed end 44B attached to structural ground SG and an adjustment end 45B connected to linkage 28.

Linkage 28 of the second embodiment includes a bell-crank link 50 and a secondary link 56 responsive to pivotal motion of the bell-crank link. In the depicted embodiment, bell-crank link 50 is mounted to pivot about a pivot axis defined by a pivot pin 51 connected to a structural ground, and has a first leg 52 and a second leg 54 angularly offset from first leg 52. First leg 52 is arranged to be engaged by first stop feature 26A as output element 18 reaches a predetermined angular position about axis 19 when rotating in first driven direction F'. The angular position is chosen to correspond with an end-of-stroke position in first drive direction F. This engagement of first leg 52 by first stop feature 26A causes pivotal motion of bell-crank link 50 in a first pivot direction (clockwise in FIG. 3; counter-clockwise in FIG. 4). First leg 52 is also arranged to be engaged by second stop feature 26B as output element 18 reaches a predetermined angular position about axis 19 when rotating in second driven direction R', wherein the angular position is chosen to correspond with an end-of-stroke position in second drive direction R. This engagement causes pivotal motion of bell-crank link 50 in a second pivot direction (counter-clockwise in FIG. 3; clockwise in FIG. 4). Second leg 54 of bell-crank link 50 is arranged to engage secondary link 56. As shown in FIG. 4, a distal end of second leg 54 may be received within a slot 58 in secondary link 56. Secondary link 56 is mounted to pivot about an axis defined by a pivot pin 57 connected to structural ground. Thus, when bell-crank link 50 is caused to pivot in its first pivot direction, secondary link 56 will pivot in a corresponding first pivot direction, and when bell-crank link 50 is caused to pivot in its second pivot direction, secondary link 56 will pivot in a corresponding second pivot direction. Secondary link 56 includes a first tab 60A connected to adjustment end 45A of first capstan spring 42A and a second tab 60B connected to adjustment end 45B of second capstan spring 42B.

As may be understood, when first stop feature 26A causes bell-crank link 50 to pivot in its first pivot direction, secondary link 56 will be pivoted such that first tab 60A will apply tension to adjustment end 45A of first capstan spring 42A to tighten first capstan spring 42A about splined coupler 16-4. Consequently, splined coupler 16-4 is frictionally clutched by first capstan spring 42A and braked against rotation in a direction corresponding to first drive direction F of drive shaft 14, thereby braking rotation of drive shaft 14 in first drive direction F. However, when counter-rotation of drive shaft 14 is commanded, splined coupler 16-4 rotates in the opposite direction such that friction force unwinds (i.e. loosens) first capstan spring 42A, thereby releasing the braking action of first capstan spring 42A and allowing the counter-rotation of drive shaft 14. In this manner, first capstan spring 42A acts as a one-way clutch and brake with respect to drive shaft 14.

Conversely, when second stop feature 26B causes bell-crank link 50 to pivot in its second pivot direction, secondary link 56 will be pivoted such that second tab 60B applies tension to adjustment end 45B of second capstan spring 42B to tighten second capstan spring 42B about splined coupler 16-4. As a result, splined coupler 16-4 is frictionally clutched by second capstan spring 42B and braked against rotation in a direction corresponding to second drive direction R of drive shaft 14, thereby braking rotation of drive shaft 14 in second drive direction R. When counter-rotation of drive shaft 14 is commanded, splined coupler 16-4 rotates in the opposite direction such that friction force unwinds (i.e. loosens) second capstan spring 42B, thereby releasing the braking action of second capstan spring 42B and allowing rotation of drive shaft 14 in the first drive direction F. Like first capstan spring 42A, second capstan spring 42B acts as a one-way clutch and brake with respect to drive shaft 14, but in an opposite direction.

In the second embodiment depicted in FIGS. 3 and 4, the capstan springs 42A, 42B are wound about a part, namely splined coupler 16-4, that is rotationally coupled to drive shaft 14. However, the invention may be embodied such that capstan springs 42A, 42B are wound about drive shaft 14 and directly engage the drive shaft.

An advantage of using capstan springs according to the second embodiment over brake plates according to the first embodiment is frictional drag reduction. In the first embodiment, one set of brake plates will always be driven with the drive shaft, resulting in drag losses on the drive shaft. In the second embodiment, each capstan spring normally has clearance relative to the part about which it is wound and does not make frictional contact until tightened by actuation of the linkage. Therefore, the system using capstan springs experiences zero drag loss.

Figure 5:
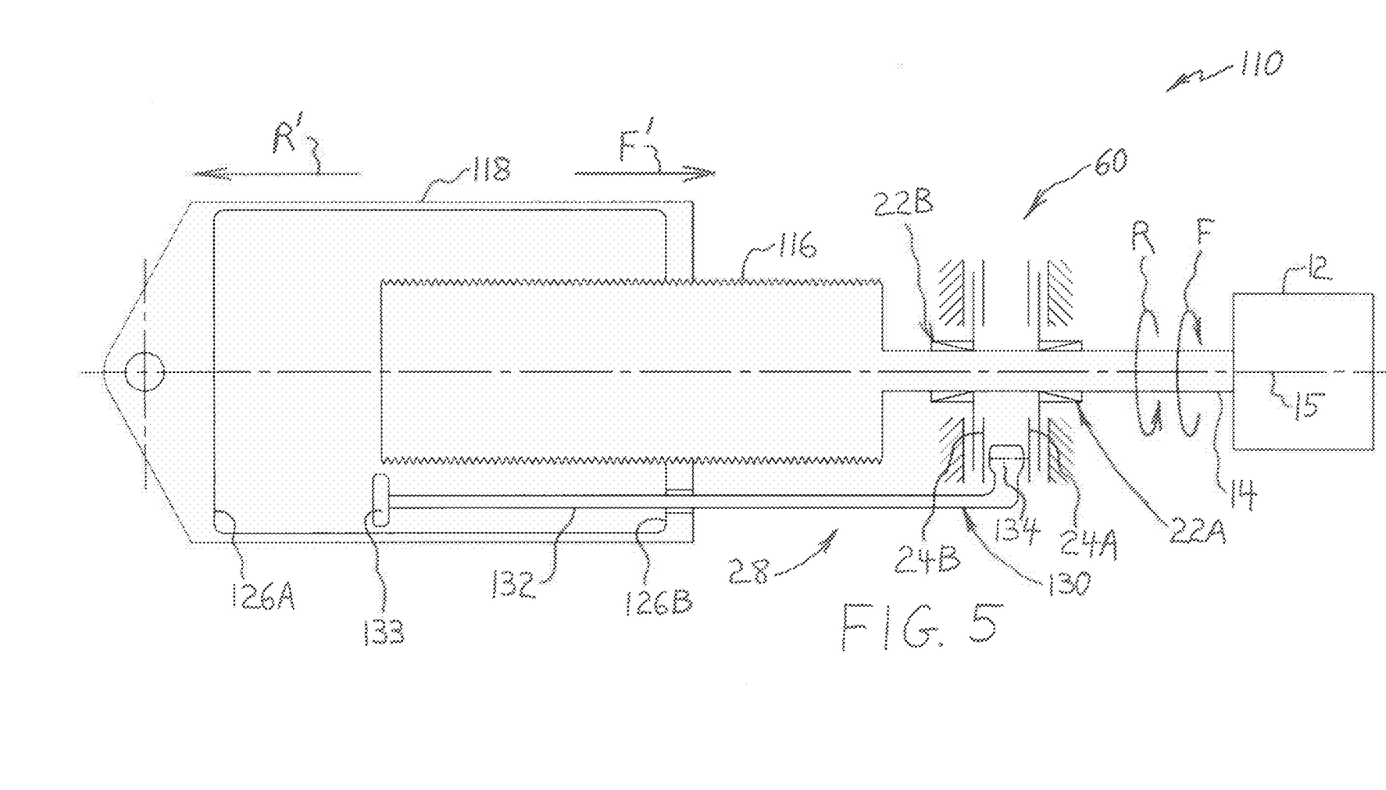
FIG. 5 is a schematic view of a stop mechanism formed in accordance with a third embodiment of the present invention.

FIG. 5 schematically illustrates a linear drive system 110 incorporating a stop mechanism 60 formed in accordance with a third embodiment of the present invention. Similar to rotary system 10 described above, linear system 110 includes motor 12 operable to rotate drive shaft 14 about axis 15 in first and second drive directions F and R. Linear system 110 also includes a screw 116 rotatably driven by rotation of drive shaft 14. Screw 116 may be, for example, a ball screw, a roller screw, an acme-threaded screw, or other type of screw. Screw 116 is mated with an actuator housing 118 acting as a linearly driven output element of linear drive system 110 responsive to motor-driven rotation of screw 116. More specifically, when drive shaft 14 is rotated in the first drive direction F, housing 118 moves linearly along axis 15 in a corresponding first driven direction F' which is to the right in FIG. 5, and when drive shaft 14 is rotated in the second drive direction R, housing 118 moves linearly along axis 15 in a corresponding second driven direction R' which is to the left in FIG. 5.

Stop mechanism 60 automatically brakes rotation of drive shaft 14 when output element 118 reaches a predetermined linear position corresponding to an end-of-stroke position of drive system 110. Stop mechanism 60 is similar to stop mechanism 20 of the first embodiment in that it comprises first one-way clutch 22A for coupling with drive shaft 14 when the drive shaft is rotating in first drive direction F but not when the drive shaft is rotating in second drive direction R, and first brake 24A connected to drive shaft 14 by way of first one-way clutch 22A and operable to stop rotation of drive shaft 14 in first drive direction F. Stop mechanism 60 further comprises a first stop feature 126A carried by output element 118, and a linkage 28 for connecting first stop feature 126A to first brake 24A. First stop feature 126A actuates linkage 28 to operate first brake 24A to stop rotation of drive shaft 14 in first drive direction F when output element 118 reaches a predetermined first limit position when moving in first driven direction F'. Thus, stop mechanism 20 provides a limit stop when linear system 110 reaches its end-of-stroke position as drive shaft 14 rotates in first drive direction F. Stop mechanism 60 may be a bidirectional stop mechanism comprising second one-way clutch 22B, second brake 24B, and a second stop feature 126B for actuating linkage 28 to provide a limit stop when linear system 110 reaches its end-of-stroke position as drive shaft 14 rotates in second drive direction R.

In the third embodiment, first stop feature 126A and second stop feature 126B may be respective surfaces of output element 118. Because output element 118 moves linearly, and operation of brakes 24A, 24B is effected by linearly directed force, linkage 28 of the third embodiment may be configured as a simple push-pull rod 130 including an axially elongated first leg 132 having an abutment end 133, and a second leg 134 orthogonal to first leg 132 for receipt between first and second brakes 24A, 24B.

As may be understood, when motor 12 is operated to rotate drive shaft 14 in first drive direction F, output element 118 moves in first driven direction F' until abutment end 133 of rod 130 is engaged by first stop feature 126A, at which point further movement of output element 118 in first driven direction F' pushes rod 130 to actuate first brake 24A, thereby stopping rotation of drive shaft 14 in first drive direction F. Drive shaft 14 remains free to rotate in second drive direction R because of the one-way nature of first one-way clutch 22A. Likewise, when motor 12 is operated to rotate drive shaft 14 in second drive direction R, output element 118 moves in second driven direction R' until abutment end 133 of rod 130 is engaged by second stop feature 126B, at which point further movement of output element 118 in second driven direction R' pulls rod 130 to actuate second brake 24B, thereby stopping rotation of drive shaft 14 in second drive direction R. Drive shaft 14 remains free to rotate in first drive direction F because of the one-way nature of second one-way clutch 22B. First and second stop features 126A, 126B are arranged to engage abutment end 133 at respective end-of-stroke limit positions of drive system 110. The limit positions are easily adjusted by changing the locations of stop features 126A, 126B.

One skilled in the art will understand that stop mechanism 60 of the third embodiment may be modified to use first and second capstan springs 42A, 42B in place of one clutches 22A, 22B and brakes 24A, 24B as taught in stop mechanism 40 of the second embodiment. A modified linkage 28 similar to that used in stop mechanism 40 would be necessary for tensioning the capstan springs 42A, 42B.

With respect to the various embodiments described above, one skilled in the art will understand that different types of one-way clutches, brakes, and linkages may be used in practicing the present invention exemplified by the above embodiments. For example, alternative types of one-way clutches include ratchet wheel and pawl clutches, spring clutches, cam actuated clutches, roller clutches, directional clutches, mechanical biasing clutches, and mechanical valve clutches. Alternative brakes include skewed roller brakes, drum brakes, drag bearings, drag devices, and decelerators. The linkage may take any form or configuration sufficient to actuate the brake or brakes in response to an end-of-stroke engagement of the linkage. For example, the linkage may include one or more shafts, rods, cables, push-pull mechanism, mechanical signal devices, cams or actuators.

An advantage of the present invention is that the brakes can be located as close to the high inertia motor as possible, because the actuation trigger force for braking comes from an output element, with no chance of jamming the motion of the motor. The reason for arranging the brakes close to the motor is that the torque is lower and therefore the size of the brake can be reduced.

While the invention as described above is embodied as a bidirectional stop mechanism limiting travel in both stroke directions, the invention is not limited to a bidirectional stop mechanism and may be implemented in only one stroke direction.

The present invention uses the actual output position of the rotary or linear drive system to trigger the application of brakes restricting undesired overtravel. The stop mechanism of the present invention is easily adjustable in terms of defining the end-of-stroke positions. In particular, the angular positions of stop features 26A, 26B on output element 18, or the linear positions of stop features 126A, 126B on output element 118, may be adjusted to change the end-of-stroke limit positions. The size of the stop mechanism is not proportional to the number of revolutions of the motor in a drive stroke, allowing for a compact size envelope. Thus, a drive system that is compact, lightweight, inexpensive, and easy to adjust with respect end-of-stroke stopping position is made possible by the present invention.

While the invention has been described in connection with exemplary embodiments, the detailed description is not intended to limit the scope of the invention to the particular forms set forth. The invention is intended to cover such alternatives, modifications and equivalents of the described embodiment as may be included within the scope of the invention.

What is claimed is:

1. A stop mechanism for a drive system having a motor, a drive shaft rotated by the motor, and an output element driven by rotation of the drive shaft, the stop mechanism comprising:
   a first one-way clutch for coupling with the drive shaft for rotation with the drive shaft when the drive shaft is rotating in a first drive direction but not when the drive shaft is rotating in a second drive direction opposite the first drive direction;
   a first brake connected to the drive shaft by way of the first one-way clutch, the first brake being operable to stop rotation of the drive shaft in the first drive direction;
   a first stop feature carried by the output element for movement with the output element; and
   a linkage for connecting the first stop feature to the first brake;
   wherein the first stop feature actuates the linkage to operate the first brake to stop rotation of the drive shaft in the first drive direction when the output element reaches a predetermined first limit position when moving in a first driven direction corresponding to the first drive direction of the drive shaft.

2. The stop mechanism according to claim 1, wherein the first one-way clutch includes a sprag clutch.

3. The stop mechanism according to claim 1, wherein the first brake comprises at least one frictional brake plate.

4. The stop mechanism according to claim 1, wherein the first one-way clutch includes a first capstan spring.

5. The stop mechanism according to claim 4, wherein the first capstan spring has a fixed end attached to a structural ground and an adjustment end connected to the linkage, wherein the first capstan spring is tightenable to act as the first brake.

6. The stop mechanism according to claim 3, wherein the linkage includes a bell-crank link having a first leg arranged to be engaged by the first stop feature to cause pivotal motion of the bell-crank link in a first pivot direction and a second leg arranged to engage the at least one frictional brake plate to operate the first brake in response to pivotal motion of the bell-crank link in the first pivot direction.

7. The stop mechanism according to claim 5, wherein the linkage includes a bell-crank link and a secondary link responsive to pivotal motion of the bell-crank link, wherein the bell-crank link has a first leg arranged to be engaged by the first stop feature to cause pivotal motion of the bell-crank link in a first pivot direction and a second leg engaging the secondary link, and wherein the secondary link includes a first tab for applying tension to the adjustment end of the first capstan spring in response to pivotal motion of the bell-crank link in the first pivot direction, whereby the first capstan spring is tightened to stop rotation of the drive shaft in the first drive direction.

8. The stop mechanism according to claim 1, wherein the first driven direction is a rotational direction.

9. The stop mechanism according to claim 1, wherein the first driven direction is a linear direction.

10. The stop mechanism according to claim 1, further comprising:
   a second one-way clutch for coupling with the drive shaft for rotation with the drive shaft when the drive shaft is rotating in the second drive direction but not when the drive shaft is rotating in the first drive direction;
   a second brake connected to the drive shaft by way of the second one-way clutch, the second brake being operable to stop rotation of the drive shaft in the second drive direction; and
   a second stop feature carried by the output element for movement with the output element;
   wherein the linkage connects the second stop feature to the second brake;
   wherein the second stop feature actuates the linkage to operate the second brake to stop rotation of the drive shaft in the second drive direction when the output element reaches a predetermined second limit position when moving in a second driven direction corresponding to the second drive direction of the drive shaft.

11. The stop mechanism according to claim 10, wherein the second one-way clutch includes a sprag clutch.

12. The stop mechanism according to claim 10, wherein the second brake comprises at least one frictional brake plate.

13. The stop mechanism according to claim 10, wherein the first one-way clutch includes a first capstan spring and the second one-way clutch includes a second capstan spring.

14. The stop mechanism according to claim 13, wherein the first capstan spring has a fixed end attached to a structural ground and an adjustment end connected to the linkage, and the second capstan spring has a fixed end attached to the structural ground and an adjustment end connected to the linkage.

15. The stop mechanism according to claim 12, wherein the linkage includes a bell-crank link having:
   a first leg arranged to be engaged by the first stop feature to cause pivotal motion of the bell-crank link in a first pivot direction and by the second stop feature to cause pivotal motion of the bell-crank link in a second pivot direction opposite the first pivot direction; and
   a second leg arranged to engage the at least one frictional brake plate of the first brake to operate the first brake in response to pivotal motion of the bell-crank link in the first pivot direction, and to engage the at least one frictional brake plate of the second brake to operate the second brake in response to pivotal motion of the bell-crank link in the second pivot direction.

16. The stop mechanism according to claim 14, wherein the linkage includes a bell-crank link and a secondary link responsive to pivotal motion of the bell-crank link, wherein the bell-crank link has:
- a first leg arranged to be engaged by the first stop feature to cause pivotal motion of the bell-crank link in a first pivot direction and to be engaged by the second stop feature to cause pivotal motion of the bell-crank link in a second pivot direction opposite the first pivot direction; and
- a second leg engaging the secondary link;

wherein the secondary link has:
- a first tab for applying tension to the adjustment end of the first capstan spring in response to pivotal motion of the bell-crank link in the first pivot direction, whereby the first capstan spring is tightened to stop rotation of the drive shaft in the first drive direction; and
- a second tab for applying tension to the adjustment end of the second capstan spring in response to pivotal motion of the bell-crank link in the second pivot direction, whereby the second capstan spring is tightened to stop rotation of the drive shaft in the second drive direction.

17. The stop mechanism according to claim 10, wherein the first driven direction and the second driven direction are rotational directions.

18. The stop mechanism according to claim 10, wherein the first driven direction and the second driven direction are linear directions.

* * * * *